US008290265B2

(12) United States Patent  
Gao et al.

(10) Patent No.: US 8,290,265 B2  
(45) Date of Patent: Oct. 16, 2012

(54) METHOD AND APPARATUS FOR SEGMENTING AN OBJECT REGION OF INTEREST FROM AN IMAGE

(75) Inventors: Feng Gao, Shenyang (CN); Na Zhou, Shenyang (CN); Wei Liu, Shenyang (CN); Huai Yuan, Shenyang (CN)

(73) Assignee: Alpine Electronics, Inc., Tokyo (JP)

( * ) Notice: Subject to any disclaimer, the term of this patent is extended or adjusted under 35 U.S.C. 154(b) by 980 days.

(21) Appl. No.: 12/331,160

(22) Filed: Dec. 9, 2008

(65) Prior Publication Data

US 2009/0154808 A1 Jun. 18, 2009

(30) Foreign Application Priority Data

Dec. 13, 2007 (CN) .......................... 2007 1 0195724

(51) Int. Cl.
*G06K 9/34* (2006.01)
*G06K 9/62* (2006.01)
*G06K 9/00* (2006.01)

(52) U.S. Cl. ......................................... 382/173; 382/225
(58) Field of Classification Search .................. 382/104, 382/106, 132, 147, 164, 173, 181, 190, 195, 382/199, 203, 224, 225, 242; 345/420, 427, 345/442

See application file for complete search history.

(56) References Cited

U.S. PATENT DOCUMENTS

| 4,300,122 | A | * | 11/1981 | McMahon | 382/147 |
| 5,343,390 | A | * | 8/1994 | Doi et al. | 382/132 |
| 5,497,451 | A | * | 3/1996 | Holmes | 345/420 |
| 6,282,317 | B1 | * | 8/2001 | Luo et al. | 382/203 |
| 2006/0002587 | A1 | | 1/2006 | Takahama et al. | |
| 2007/0116356 | A1 | * | 5/2007 | Gong et al. | 382/173 |
| 2009/0154808 | A1 | * | 6/2009 | Gao et al. | 382/173 |

FOREIGN PATENT DOCUMENTS

JP 08-320999 12/1996

OTHER PUBLICATIONS

Office Action (with English translation) dated Feb. 23, 2011 for Chinese Patent Application No. 200710195724.6, 7 pages.

Wang, Ze-hua, et al, "Study on Segmenting Method of Vehicle License Plate", *Journal of Qingdao University of Science and Technology*, vol. 26, No. 4, Aug. 2005, 5 pages.

* cited by examiner

*Primary Examiner* — Amir Alavi

(74) *Attorney, Agent, or Firm* — Brinks Hofer Gilson & Lione

(57) ABSTRACT

A method for segmenting an object region of interest from an image includes detecting each corner in a captured image; acquiring edges of the object from the captured image based on the detected corners; clustering the detected corners based on corners on the acquired edges; and segmenting the image region in the captured image formed by the clustered corners as a region of interest that likely includes the object. With this method and apparatus for the method, an object region of interest may be segmented from an image without utilizing features such as an object shadow and edges.

16 Claims, 9 Drawing Sheets

COLUMNS OF THE IMAGE

METHOD AND APPARATUS FOR SEGMENTING AN OBJECT REGION OF INTEREST FROM AN IMAGE

RELATED APPLICATION

The present application claims priority to Chinese Patent Application Number 200710195724.6, filed Dec. 13, 2007, the entirety of which is hereby incorporated by reference.

TECHNICAL FIELD

The invention relates to object detection based on computer vision, and particularly to a method and apparatus for segmenting an object region of interest from an image.

BACKGROUND ART

An existing method for detecting vehicles based on computer vision segments an image region that probably includes a vehicle as a vehicle region of interest from an image captured by an imaging device, such as a video camera, according to features such as the vehicle shadow and vehicle edges.

However, in a bad environment with low contrast, such as when it is raining, snowing, or foggy, the features, such as vehicle shadow and vehicle edges, will be significantly diminished (as shown in FIG. 1a), or may even vanish (as shown in FIG. 1b). In this case, segmenting a vehicle region of interest from an image according to the vehicle shadow and vehicle edges may not be possible.

SUMMARY

In view of the above the problem, it is an object of the present invention to provide a method and apparatus for segmenting an object region of interest from an image, which can segment an object region of interest from an image without utilizing features such as vehicle shadow and vehicle edges.

To achieve this goal, a method for segmenting an object region of interest from an image according to one embodiment of the invention comprises detecting each corner in at least a portion of a captured image; acquiring edges of the object from the captured image based on the detected corners; clustering the detected corners based on corners on the acquired edges; and segmenting the image region in the captured image formed by the clustered corners as a region of interest that likely includes the object.

To achieve the goal, an apparatus for segmenting an object region of interest from an image according to one embodiment of the invention comprises a detecting means for detecting each corner in at lease a portion of a captured image; an acquiring means for acquiring edges of the object from the captured image based on the detected corners; a clustering means for clustering the detected corners based on corners on the acquired edges; and a segmenting means for segmenting the image region in the captured image formed by the clustered corners as a region of interest that likely includes the object.

BRIEF DESCRIPTION OF THE DRAWINGS

Other features, characters and advantages of the invention will be more apparent from the following detail description in conjunction with the accompanying drawings, wherein.

DETAILED DESCRIPTION

Figure 1A:
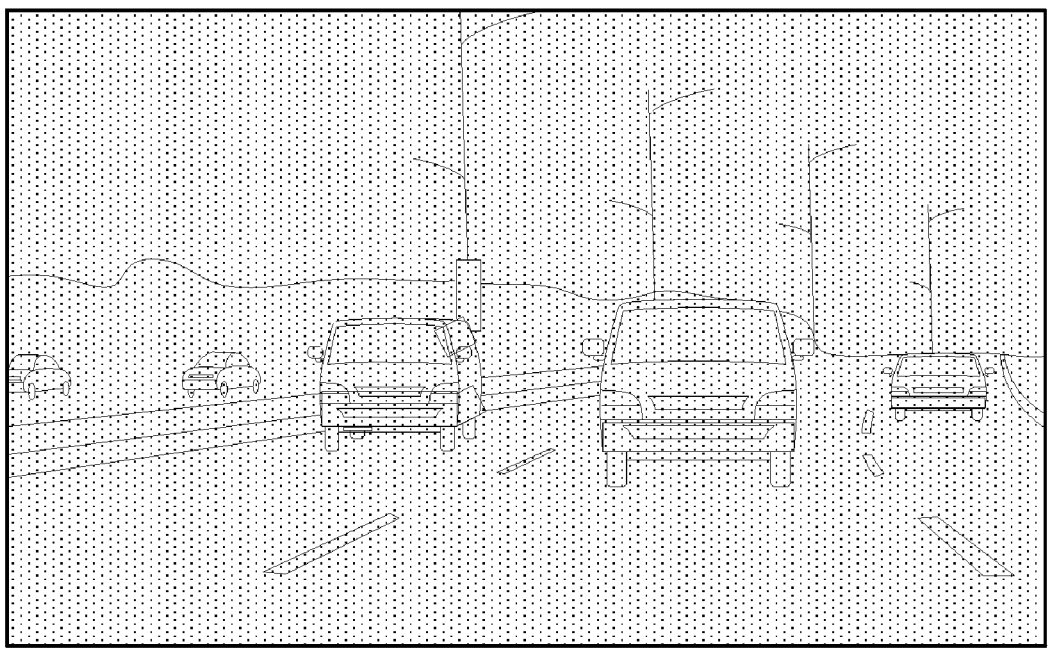
FIGS. 1a and 1b show images captured in a bad environment.
Figure 1B:
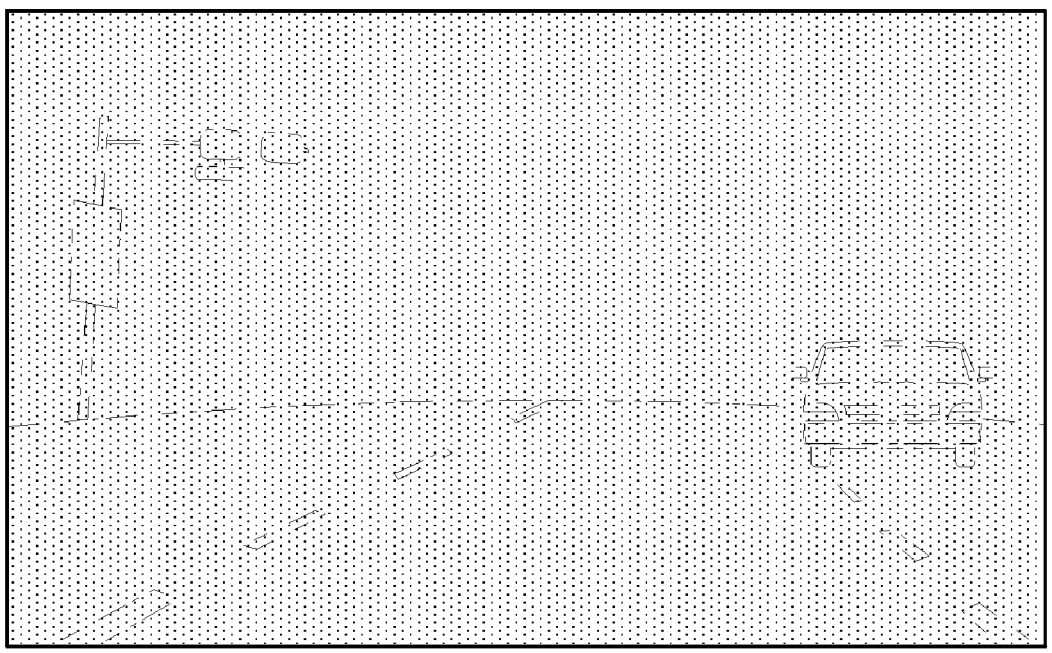
Figure 2A:
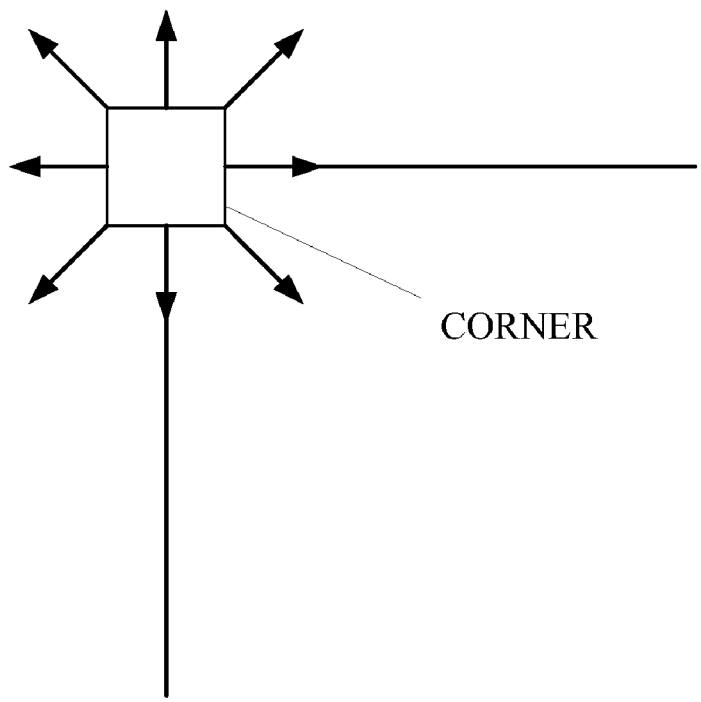
FIG. 2a shows a schematic drawing of a corner.
Figure 2B:
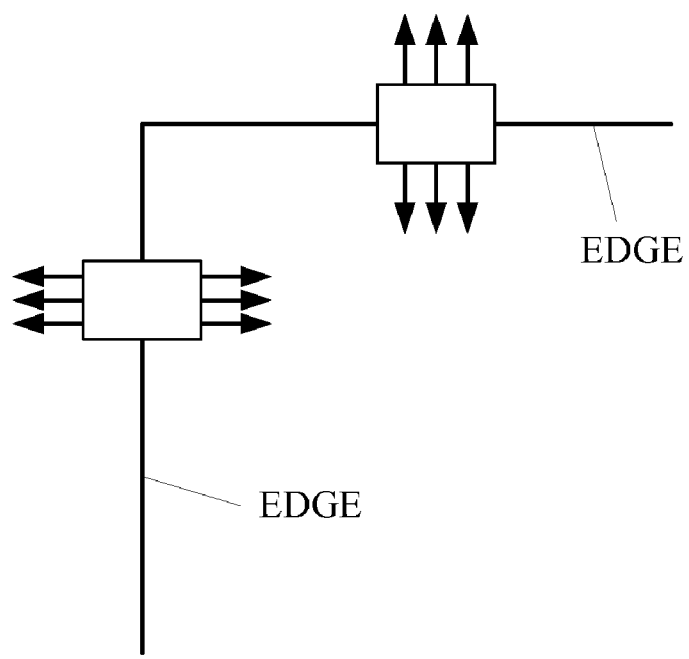
FIG. 2b shows a schematic drawing of edges.

According to one aspect, first, corners are detected from a captured image, wherein corners refer to points whose intensity varies more significantly compared with other points in any direction (horizontal direction, vertical direction, or directions of any angles as shown in FIG. 2a), and a corner is different from an edge in that the intensity of the edge only varies with respect to other points in the direction perpendicular to the edge (as shown in FIG. 2b). Second, edges of an object are acquired from the captured image by utilizing the detected corners. Next, the detected corners are clustered based on the corners in the acquired edges, and lastly, the image region in the captured image formed by the clustered corners is segmented as a region of interest that likely includes the object.

The method and apparatus for segmenting an object region of interest from an image according to various embodiments of the invention will be described in more detail below, taking a vehicle as an example of the object in conjunction with the accompanying drawings.

(First Embodiment)

Figure 3:
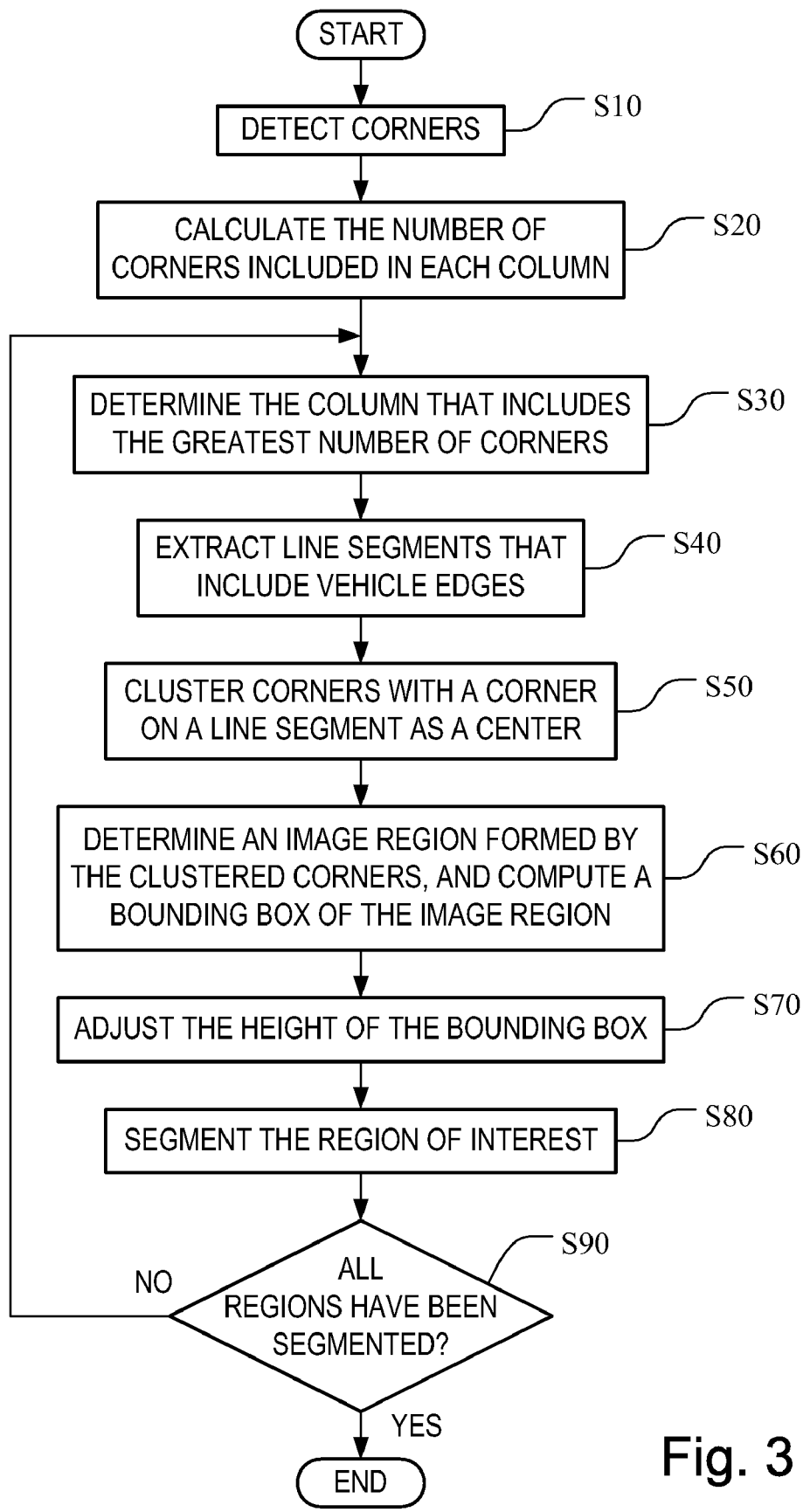
FIG. 3 is a flowchart of a method for segmenting a vehicle region of interest from an image according to a first embodiment of the invention.
Figure 4:
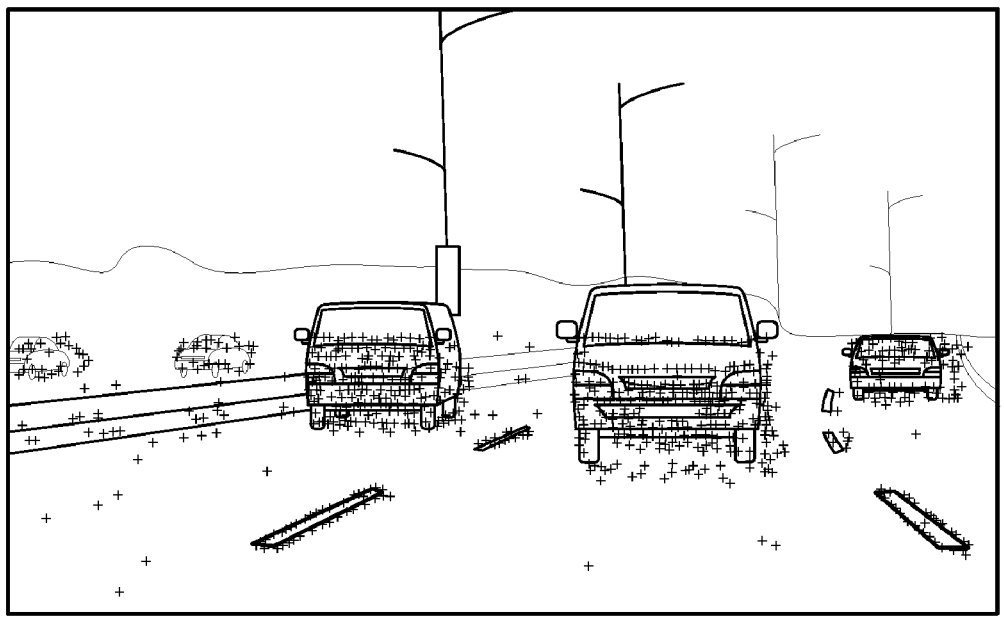
FIG. 4 illustrates detected corners according to one embodiment of the invention.

FIG. 3 is a flowchart of a method for segmenting a vehicle region of interest from an image according to the first embodiment of the invention. As shown in FIG. 3, first, in step S10, corners in the portion below the vanishing line in the image captured by an imaging device such as a video camera are detected by using a corner detecting method (as illustrated in FIG. 4). The corner detecting method may be any one of the various existing or forthcoming corner detecting methods, such as the Harris corner detecting method, or the SUSAN corner detecting algorithm.

Figure 5:
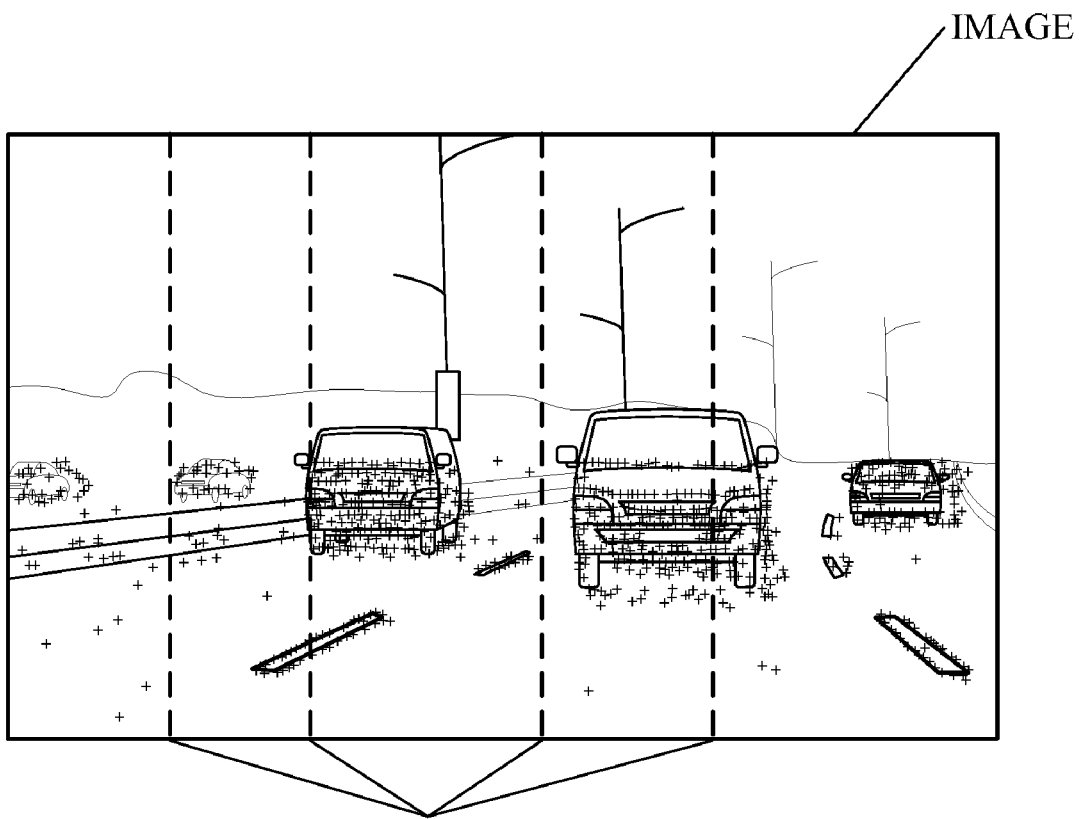
FIG. 5 illustrates columns in an image according to one embodiment of the invention.
Figure 6:
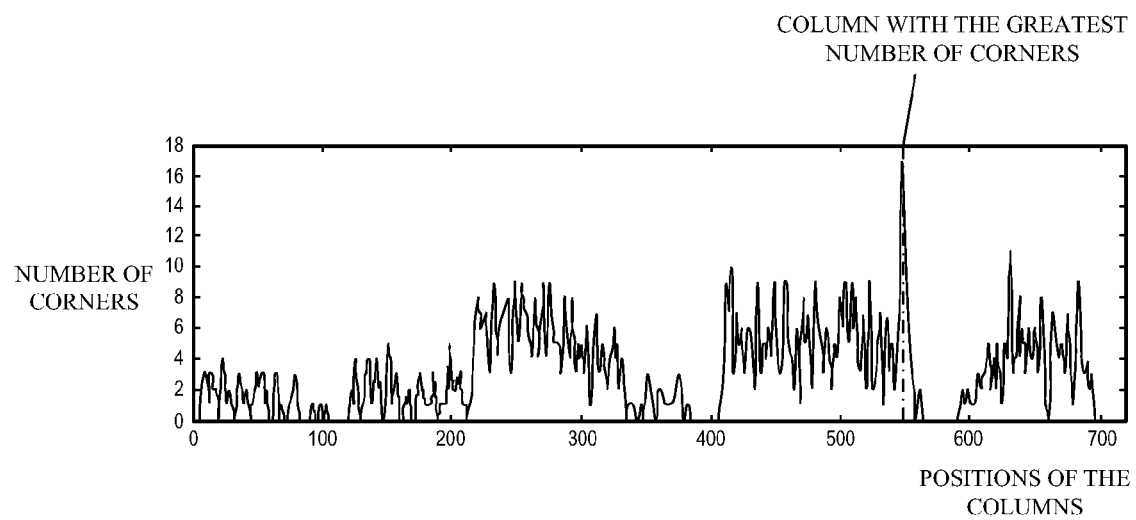
FIG. 6 illustrates a statistical histogram of corners according to one embodiment of the invention.

Then, in step S20, the number of corners included in each column (as illustrated in FIG. 5) of the captured image are calculated, so as to obtain a statistical histogram of corners of the captured image (as shown in FIG. 6). The width ΔT of each column can be set according to actual requirements, which in this embodiment is ΔT=2.

In step S30, the column that includes the greatest number of corners is determined from the captured image according to the statistical histogram of corners. It is known from the principle of corner detecting methods that, generally in an image, more corners appear at the vehicle edges and fewer corners appear at the location of the vehicle body itself, and the fewest number of corners appear in plane objects such as even road surfaces. Therefore, the column that includes the greatest number of corners in the captured image usually includes vehicle edges.

In step S40, line segments that include vehicle edges are extracted from the column that includes the greatest number of corners. The process for extracting line segments that include vehicle edges according to one embodiment of the invention will be explained in detail in conjunction with FIG. 9.

In step S50, the detected corners in the captured image are clustered with a predetermined clustering radius based on the corners in the extracted line segments. Specifically, the process of clustering is as follows: it is supposed that N corners are detected from the image, which compose a set $C_S$, $C_S = \{C_1, C_2, \ldots, C_N\}$. Any one of the corners $C_i$ on the extracted line segment is selected as a clustering origin with T as a clustering radius to start clustering, such that the corners $C_j (j \neq i, C_j \in C_s)$ falling within a circle with $C_i$ as the clustering origin and T as the clustering radius constitute a cluster Z. Next, the above process is repeated with all the other corners in cluster Z with $C_j$ as the clustering origin and with T as the clustering radius, until no corner complying with this condition is added into cluster Z. Thus, a cluster Z is formed. In this embodiment, the clustering radius is equal to the length of the extracted line segment. However, the invention is not limited to that, and in other embodiments the clustering radius may have other values according to the actual requirements.

Figure 7:
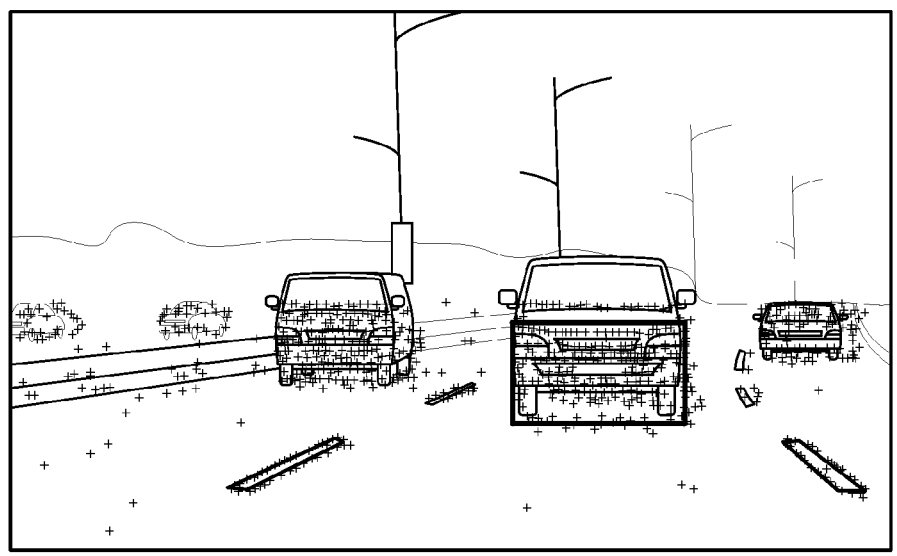
FIG. 7 illustrates a bounding box of an image region formed by the corners obtained by clustering according to one embodiment of the invention.

In step S60, an image region formed by the corners obtained by clustering is determined from the captured image, and a bounding box of this image region is computed, as shown in FIG. 7.

The method of computing the bounding box is as follows:
top border of the box $$BoundingBox_{top} = \min_{i=1}^{N} y_1, (x_1, y_1) \in C$$

bottom border of the box $$BoundingBox_{bottom} = \max_{i=1}^{N} y_1, (x_1, y_1) \in C$$

left border of the box $$BoundingBox_{left} = \min_{i=1}^{N} x_1, (x_1, y_1) \in C$$

right border of the box $$BoundingBox_{right} = \max_{i=1}^{N} x_1, (x_1, y_1) \in C$$

Figure 8:
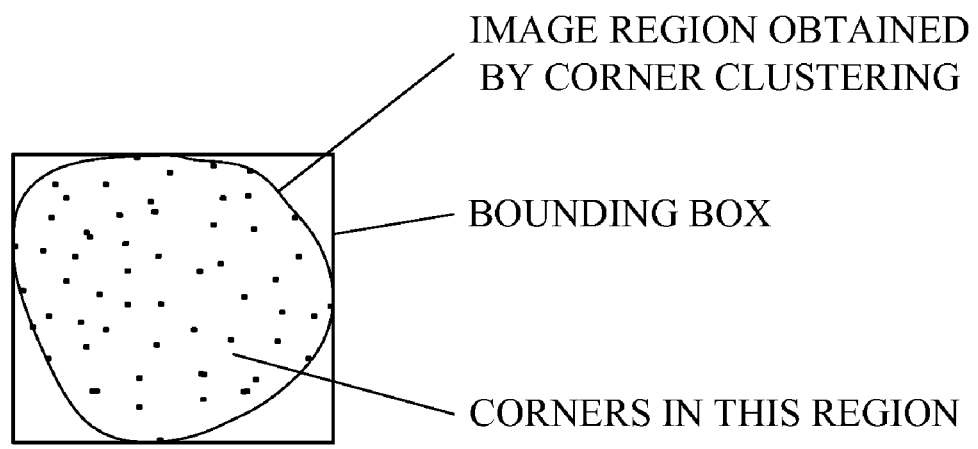
FIG. 8 is a schematic drawing of an image region formed by the corners obtained by clustering and the bounding box thereof according to one embodiment of the invention.

Here, C is the image region formed by the corners obtained by clustering, $x_i$ and $y_i$ are the coordinates of the corners in C, and BoundingBox is the obtained bounding box, as illustrated in FIG. 8.

Figure 9:
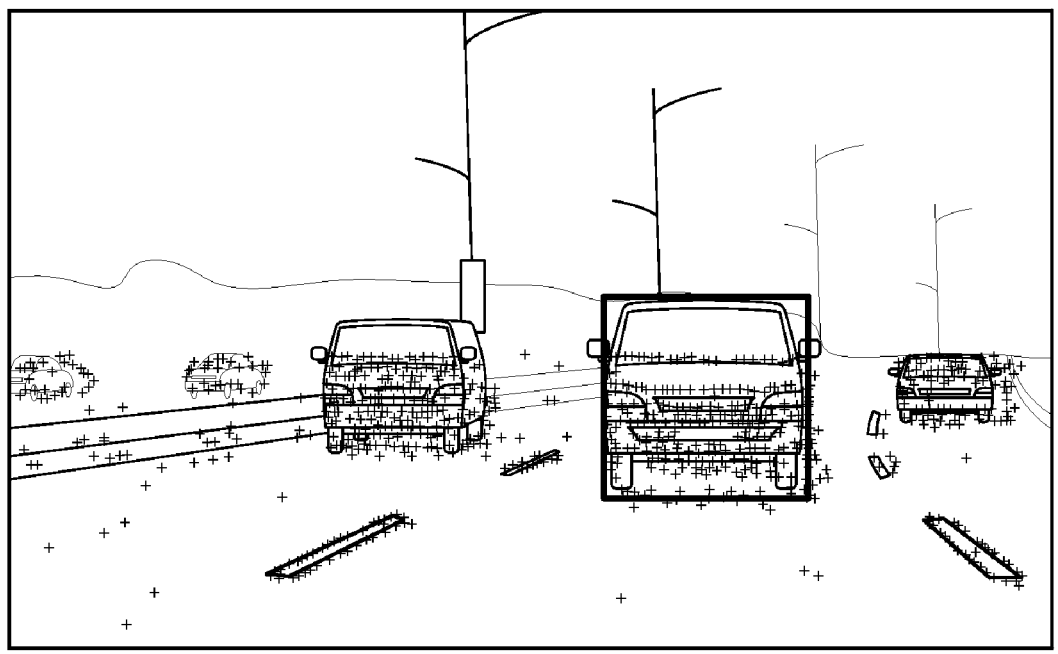
FIG. 9 illustrates an adjusted bounding box according to one embodiment of the invention.

In step S70, the height of the bounding box is adjusted according to the aspect ratio of the actual vehicle, as shown in FIG. 9.

In step S80, the adjusted bounding box is segmented from the captured image as a region of interest that likely includes a vehicle.

In step S90, it is judged whether all regions of interest that may include a vehicle have been segmented from the captured image. If the judging result is NO, the process returns to step S30 to determine other regions of interest that may include a vehicle based on each column in the captured image except for the columns covered by the image regions that have been segmented as regions of interest previously. If the judging result is YES, the process is ended.

Figure 10:
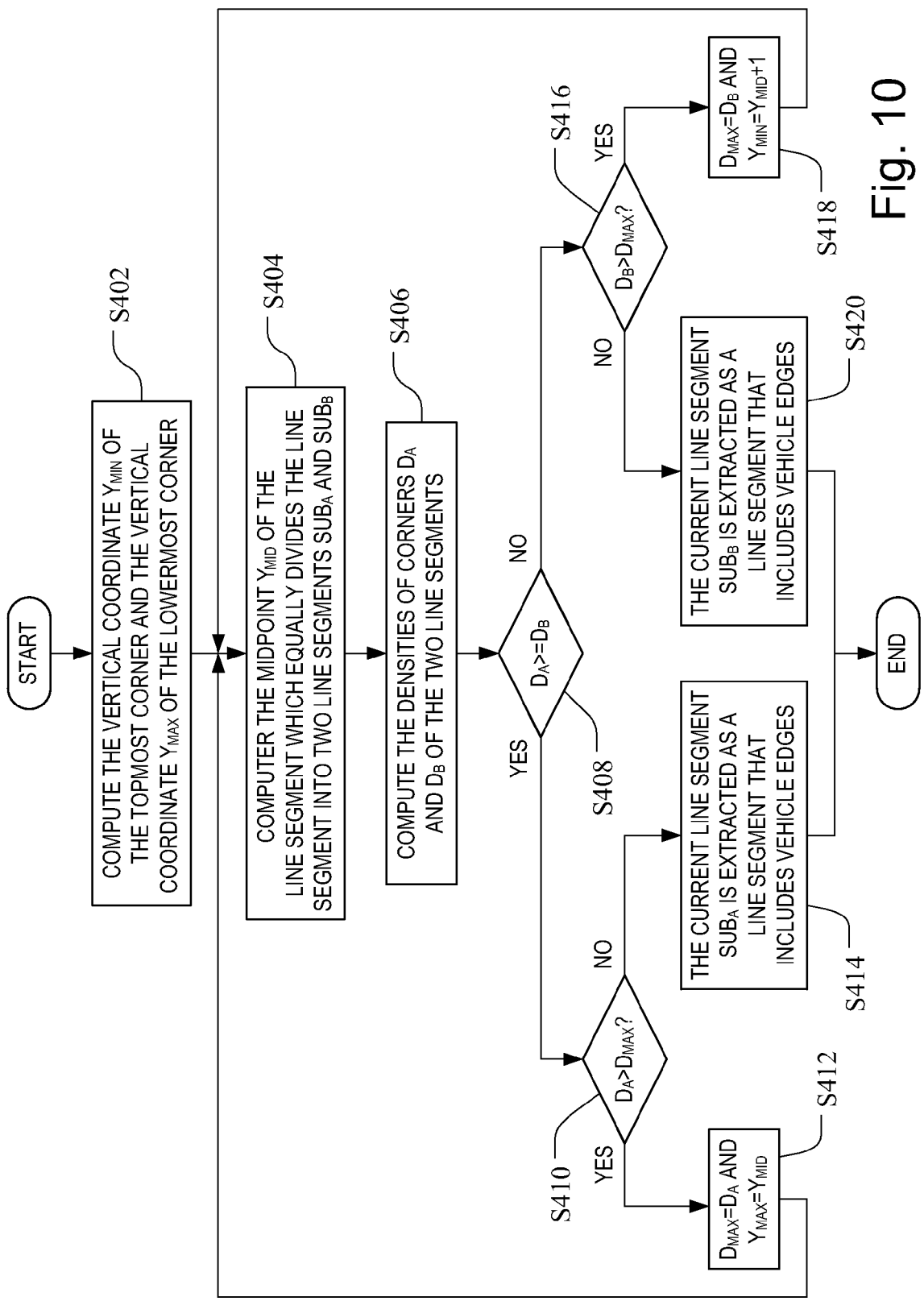
FIG. 10 is a flowchart of a process for extracting line segments that include vehicle edges according to one embodiment of the invention.

FIG. 10 is a flowchart of a process for extracting line segments that include vehicle edges according to one embodiment of the invention.

First, in step S402, the vertical coordinate $Y_{min}$ of the topmost corner and the vertical coordinate $Y_{max}$ of the lowermost corner in the column that includes the greatest number of corners are computed according to coordinate information of each corner in the column in the image.

$$Y_{min} = \min_{i=1}^{CN} y_1, x_i \in E_x, \quad Y_{max} = \max_{i=1}^{CN} y_i, x_i \in E_x$$

Here, $x_i$ and $y_i$ are the horizontal coordinate and the vertical coordinate of the ith corner $C(x_i, y_i)$ in the column that includes the greatest number of corners, respectively, CN is the number of the corners in that column, and $E_x$ is the column that includes the greatest number of corners.

In step S404, the midpoint $Y_{mid} = (Y_{min} + Y_{max})/2$ of line segment $Y_{min} Y_{max}$ is computed according to $Y_{min}$ and $Y_{max}$. The midpoint $Y_{mid}$ equally divides the line segment $[Y_{min}, Y_{max}]$ into two line segments $Sub_A = [Y_{min}, Y_{mid}]$ and $Sub_B [Y_{mid}, Y_{max}]$.

In step S406, the densities of corners in line segments $Sub_A$ and $Sub_B$ are computed. The definition of the density of corners is as follows:

$$D_A = \frac{\sum_{i=1}^{CN} S_A(i)}{Len_A}, \quad D_B = \frac{\sum_{i=1}^{CN} S_B(i)}{Len_B}$$

Here, $Len_A$ and $Len_B$ are the lengths of line segments $Sub_A$ and $Sub_B$, respectively, and $D_A$ and $D_B$ are the densities of corners in line segments $Sub_A$ and $Sub_B$, respectively.

$$Len_A = Y_{mid} - Y_{min} + 1, \quad Len_B = Y_{max} - Y_{mid}$$

$$S_A(i) = \begin{cases} 1, & x_i \in E_x \cap y_i \in [Y_{min}, Y_{mid}] \\ 0, & \text{others} \end{cases}$$

$$S_B(i) = \begin{cases} 1, & x_i \in E_x \cap y_i \in [Y_{mid}, Y_{max}] \\ 0, & \text{others} \end{cases}$$

In step S408, the line segment with a larger density of corners is selected from the line segments $Sub_A$ and $Sub_B$ computed at that time. If the densities of corners of line segments $Sub_A$ and $Sub_B$ are the same, line segment $Sub_A$ is selected.

If the selected line segment with a larger density of corners is line segment $Sub_A$, in step S410 it is judged whether its density $D_A$ is larger than $D_{max}$ (with an initial value 0). If the judging result is positive, in step S412 it is set that $D_{max}=D_A$ and $Y_{max}=Y_{mid}$, and then the process returns to step S404. If the judging result is negative, at step S414 the current line segment $Sub_A$ is extracted as a line segment that includes vehicle edges.

If the selected line segment with a larger density of corners is line segment $Sub_B$, in step S416 it is judged whether its density $D_B$ is larger than $D_{max}$. If the judging result is positive, in step S418 it is set that $D_{max}=D_B$ and $Y_{min}=Y_{mid}+1$, then the process returns to step S404. If the judging result is negative, at step S420 the current line segment $Sub_B$ is extracted as a line segment that includes vehicle edges.

(Second Embodiment)

In the second embodiment, after a region of interest is obtained by segmentation according to the procedure of the first embodiment, the region of interest obtained by segmentation is further processed to obtain a more accurate region of interest.

Figure 11:
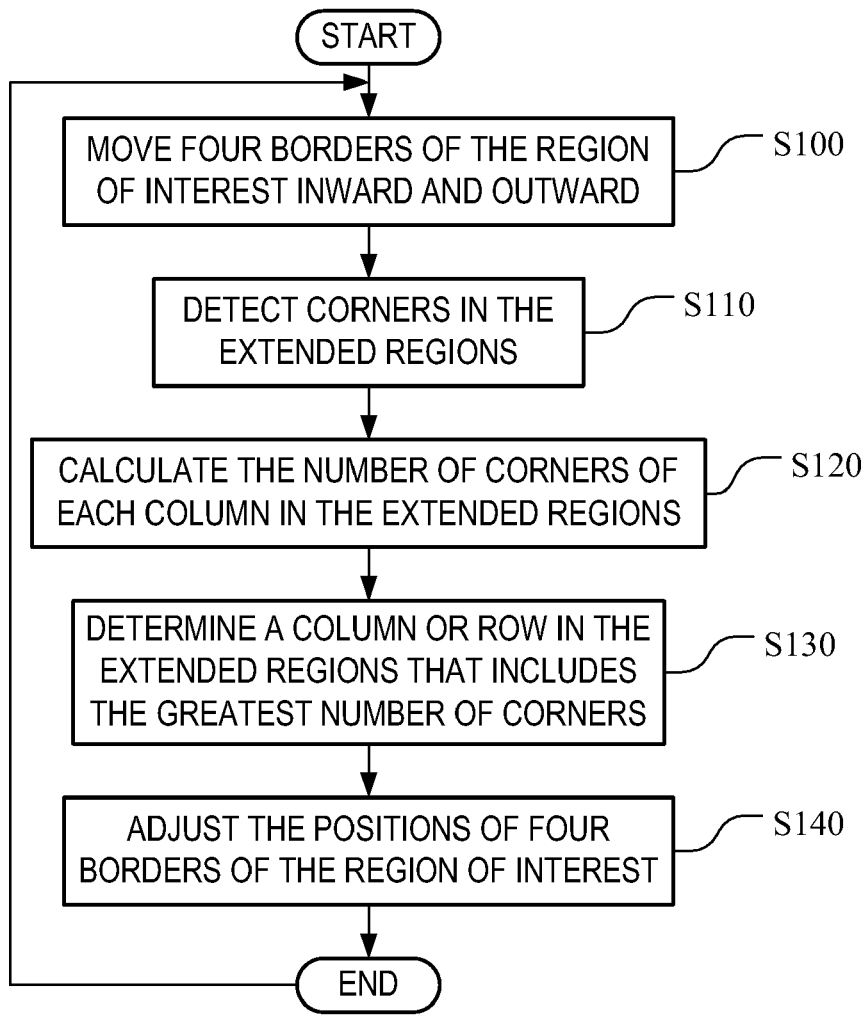
FIG. 11 is a flowchart of a method for segmenting a vehicle region of interest from an image according to a second embodiment of the invention.

FIG. 11 is a flowchart of a method for segmenting a vehicle region of interest from an image according to the second embodiment of the invention. In order to avoid repeated explanation, only the steps different from that of the first embodiment are shown in FIG. 11.

Figure 12:
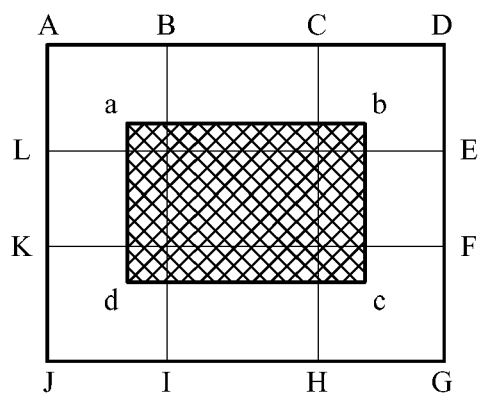
FIG. 12 is a schematic drawing of the extension of the region of interest according to one embodiment of the invention.

As shown in FIG. 11, in step S100, in the captured image, the left border and the right border of the region of interest obtained by segmentation in step S80 are moved inward and outward by a certain width, respectively, and the top border and the bottom border of the region of interest are moved inward and outward by a certain height, respectively, so as to obtain four extended regions, i.e., a left extended region, a right extended region, a top extended region and bottom extended region. Here, the certain width is $\Delta W=0.1\times$(width of the region of interest), and the certain height is $\Delta H=0.1\times$(height of the region of interest). FIG. 12 is a schematic drawing of an extension of the region of interest according to one embodiment of the invention, wherein abcd represents a region of interest before extension, ABIJ represents a left extended region, CDGH represents a right extended region, ADEL represents a top extended region and FGJK represents a bottom extended region.

In step S110, corners within the left extended region, right extended region, top extended region, and bottom extended region are detected by using a corner detecting method.

In step S120, the number of corners of each column in the left extended region and the right extended region are calculated, as well as the number of corners of each row in the top extended region and the bottom extended region.

In step S130, the column in the left extended region that includes the greatest number of corners, the column in the right extended region that includes the greatest number of corners, the row in the top extended region that includes the greatest number of corners, and the row in the bottom extended region that includes the greatest number of corners are determined.

In step S140, positions of the four borders of the region of interest are adjusted, that is to say, the left border of the region of interest is adjusted to the column in the left extended region that includes the greatest number of corners, the right border of the region of interest is adjusted to the column in the right extended region that includes the greatest number of corners, the top border of the region of interest is adjusted to the row in the top extended region that includes the greatest number of corners, and the bottom border of the region of interest is adjusted to the row in the bottom extended region that includes the greatest number of corners.

Although, in the first embodiment, corners in the portion below the vanishing line in a captured image are detected, the invention is not limited to that. In other embodiments of the invention, corners in the entire captured image may be detected.

Although, in step S70 of the first embodiment, the height of the bounding box is adjusted according to the aspect ratio of an actual vehicle, the invention is not limited to that. In other embodiments of the invention, the height of the bounding box may not be adjusted.

Although, in the second embodiment, four borders of the region of interest are adjusted concurrently, in other embodiments of the invention, only one border, two borders, or three borders of the region of interest may be adjusted.

Although, in the second embodiment, the borders of the region of interest are moved inward and outward concurrently by a predetermined width, respectively, so as to obtain extended regions, the invention is not limited to that. In other embodiments of the invention, it is possible to extend the borders of the region of interest only inward or outward by a predetermined width to obtain the extended regions.

Although, in the second embodiment, corners in each of the four extended regions of the region of interest are re-detected, in other embodiments of the invention, if the corners in any of the four extended regions have been detected previously, the previously detected corners may be directly used to calculate the number of corners in each column or row of that extension region.

Although, in the first and second embodiments, the image region that likely includes a vehicle is segmented from an image, in other embodiments of the invention, an image region that likely includes another object such as a passerby, etc. may be segmented.

The method for segmenting an object region of interest from an image according to the invention may be implemented by means of software or hardware, as well as a combination thereof.

Figure 13:
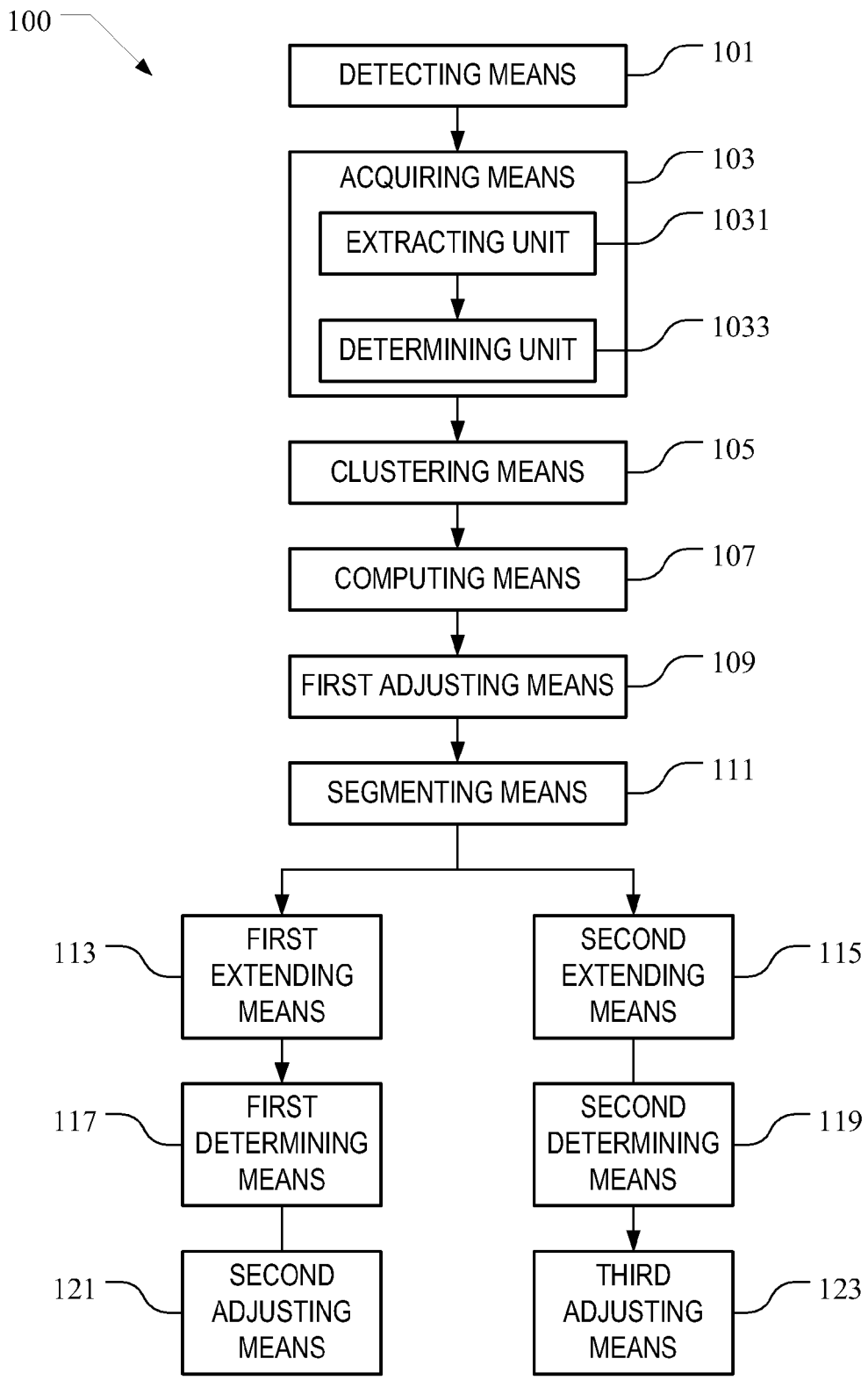
FIG. 13 is a schematic drawing of an apparatus for segmenting a vehicle region of interest from an image according to the first embodiment of the invention.

FIG. 13 is a schematic drawing of an apparatus for segmenting a vehicle region of interest from an image according to the first embodiment of the invention. Only the modules related to the invention are shown.

As shown in FIG. 13, an apparatus 100 for segmenting a vehicle region of interest from an image includes:

a detecting means 101 for detecting each corner in at least a portion of a captured image, e.g., for detecting each corner in the portion below the vanishing line of the captured image;

an acquiring means 103 for acquiring edges of an object from the captured image based on the detected corners, wherein the acquiring means 103 further includes an extracting unit 1031 for extracting the column that includes the greatest number of corners from each column except for the columns covered by the image regions that have been segmented as regions of interest previously from the captured image; and a determining unit 1033 for determining a line segment with the density of corners larger than a predetermined value as an edge of the object from the extracted column;

a clustering means 105 for clustering the detected corners based on corners on the acquired edge;

a computing means 107 for computing a bounding box of the image region;

a first adjusting means 109 for adjusting the height of the bounding box according to the aspect ratio of the object;

a segmenting means 111 for segmenting the bounding box as the region of interest from the captured image;

a first extending means 113 for moving at least one of the left border and the right border of the region of interest inward and/or outward by a predetermined width, respectively;

a second extending means 115 for moving at least one of the top border and the bottom border of the region of interest inward and/or outward by a predetermined height, respectively, so as to obtain extended regions;

a first determining means 117 for determining a column that includes the greatest number of corners in the extended regions obtained by the first extending means 113;

a second determining means 119 for determining a row that includes the greatest number of corners in the extended regions obtained by the second extending means 115;

a second adjusting means 121 for adjusting the corresponding border of the left border or the right border of the region of interest to the column found by the first determining means 117; and a third adjusting means 123 for adjusting the corresponding border of the top border or the bottom border of the region of interest to the row found by the second determining means 119.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A method for segmenting an object region of interest from an image, comprising:
    detecting each corner in at least a portion of a captured image;
    acquiring edges of the object from the captured image based on the detected corners;
    clustering the detected corners based on corners on the acquired edges; and
    segmenting an image region in the captured image formed by the clustered corners as a region of interest that likely includes the object.

2. The method according to claim 1, wherein the acquiring act further comprises:
    extracting a column in the captured image that includes the greatest number of corners; and
    determining a line segment with a density of corners larger than a predetermined value as an edge of the object from the extracted column.

3. The method according to claim 2, wherein the acquiring act further comprises:
    extracting the column that includes the greatest number of corners from each column except for the columns covered by an image region that has been segmented as a region of interest previously from the captured image.

4. The method according to claim 1, further comprising:
    computing a bounding box of the image region; and
    segmenting the bounding box from the captured image as the region of interest.

5. The method according to claim 4, further comprising:
    adjusting a height of the bounding box according to an aspect ratio of the object before segmenting the bounding box.

6. The method according to claim 1, further comprising:
    moving at least one of a left border and a right border of the region of interest inward and/or outward by a predetermined width, respectively, so as to obtain an extended region;
    determining a column that includes the greatest number of corners in the extended region; and
    adjusting the corresponding border of the left border or the right border of the region of interest to the determined column.

7. The method according to claim 1, further comprising:
    moving at least one of a top border and a bottom border of the region of interest inward and/or outward by a predetermined height, respectively, so as to obtain an extended region;
    determining a row that includes the greatest number of corners in the extended region; and
    adjusting the corresponding border of the top border or the bottom border of the region of interest to the determined row.

8. The method according to claim 1, wherein the detected corners are detected in a portion below a vanishing line in the captured image.

9. An apparatus for segmenting an object region of interest from an image, comprising:
    a detecting means for detecting each corner in at least a portion of a captured image;
    an acquiring means for acquiring edges of the object from the captured image based on the detected corners;
    a clustering means for clustering the detected corners based on corners on the acquired edges; and
    a segmenting means for segmenting an image region in the captured image formed by the clustered corners as a region of interest that likely includes the object.

10. The apparatus according to claim 9, wherein the acquiring means further comprises:
    an extracting unit for extracting a column in the captured image that includes the greatest number of corners; and
    a determining unit for determining a line segment with a density of corners larger than a predetermined value as an edge of the object from the extracted column.

11. The apparatus according to claim 10, wherein the extracting unit extracts the column that includes the greatest number of corners from each column except for the columns covered by an image region that has been segmented as a region of interest previously from the captured image.

12. The apparatus according to claim 9, further comprising:
    a computing means for computing a bounding box of the image region,
    wherein the segmenting means is configured for segmenting the bounding box from the captured image as the region of interest.

13. The apparatus according to claim 12, further comprising:
    a first adjusting means for adjusting a height of the bounding box according to an aspect ratio of the object before segmenting the bounding box.

14. The apparatus according to claim 9, further comprising:
    a first extending means for moving at least one of a left border and a right border of the region of interest inward and/or outward by a predetermined width, respectively, so as to obtain an extended region;

a first determining means for determining a column that includes the greatest number of corners in the extended region; and a second adjusting means for adjusting the corresponding border of the left border or the right border of the region of interest to the determined column.

15. The apparatus according to claim 9, further comprising:

a second extending means for moving at least one of a top border and a bottom border of the region of interest inward and/or outward by a predetermined height, respectively, so as to obtain an extended region;

a second determining means for determining a row that includes the greatest number of corners in the extended region; and a third adjusting means for adjusting the corresponding border of the top border or bottom border of the region of interest to the determined row.

16. The apparatus according to claim 9, wherein the detected corners are detected in a portion below a vanishing line in the captured image.

* * * * *